(12) United States Patent
Hinton et al.

(10) Patent No.: US 8,295,388 B1
(45) Date of Patent: Oct. 23, 2012

(54) EFFICIENT DIGITAL UPCONVERTER

(75) Inventors: Ryan Hinton, Crozet, VA (US); Osama S. Haddadin, Salt Lake City, UT (US); Justin Petersen, Stansbury Park, UT (US)

(73) Assignee: L-3 Communications, Corp., New York, NY (US)

( * ) Notice: Subject to any disclaimer, the term of this patent is extended or adjusted under 35 U.S.C. 154(b) by 995 days.

(21) Appl. No.: 12/325,936

(22) Filed: Dec. 1, 2008

(51) Int. Cl.
*H04L 27/00* (2006.01)
(52) U.S. Cl. ......... 375/295; 375/219; 375/350; 708/313
(58) Field of Classification Search .................. 375/295, 375/219, 350; 708/313
See application file for complete search history.

(56) References Cited

U.S. PATENT DOCUMENTS

| | | | | |
|---|---|---|---|---|
| 5,521,938 A | * | 5/1996 | Stewart et al. | 375/146 |
| 7,206,357 B2 | | 4/2007 | Rakib et al. | |
| 2002/0156820 A1 | * | 10/2002 | Kishi | 708/300 |

OTHER PUBLICATIONS

Lyons, Richard G., Digital Signal Processing Tricks-Frequency Translation Without Multiplication, article, Sep. 24, 2007, pp. 1-7.
Laakso et al. "Splitting the Unit Delay," IEEE Signal Processing Magazine (Jan. 1996), pp. 30-60.

* cited by examiner

*Primary Examiner* — Zewdu Kassa
(74) *Attorney, Agent, or Firm* — Kirton McConkie; N. Kenneth Burraston

(57) ABSTRACT

Techniques for efficient upconversion can process complex input data, such as for example data in an inphase and quadrature form. Half sample interpolation filtering and delay can be performed, and the results can be combined in a quarter-rate upconverter. The quarter rate upconversion can allow one of the half-sample interpolating filtering and the delay to be performed on one of either the inphase and quadrature samples.

21 Claims, 3 Drawing Sheets

EFFICIENT DIGITAL UPCONVERTER

FIELD

The present application relates to digital signal processing. More particularly, the present application relates to techniques for efficient digital upconversion.

BACKGROUND

In digital communications systems, digital data is translated into analog radio signals for transmission, and received radio signals are processed to extract the digital data. In digital communications systems, a mixture of analog and digital components is often used. Typically, digital components are used in the data processing portions of these systems, while analog components are used in the radio frequency portions.

Over the years, the boundary between the digital portions and analog portions has trended toward the analog ends of these systems. Functions formerly performed using analog components have been taken over by digital components. Digital components can offer over advantages over analog components, such as repeatability, stability, and cost. As a particular example, in complex baseband processing, it can be difficult to match gain, phase, filter responses, and other parameters between the inphase channel and quadrature channel when analog components are used.

Unfortunately, the bandwidth of signals that can be processed by a digital system is limited by the sampling rate. Higher sample rates can allow higher bandwidths, but also require higher processing rates. Thus, as sample rates increase, faster digital signal processors and/or increased numbers of processing components are often required. In some situations, the desired sample rates are less than the available processing, limiting the bandwidth (and in some situations, the communications data rate) that can be provided.

A particular area where a limitation in sample rate or processing speed is felt is in performing digital upconversion of signals, for example, as used in a transmitter. In transmission, digital data is typically encoded into a modulated signal, converted into analog form, and then upconverted (typically in several steps) to the desired transmission frequency. Some of this upconversion can be performed digitally, however this can be a processing intensive operation.

SUMMARY

Accordingly, techniques to provide for more efficient digital upconversion have been developed.

In some embodiments of the invention a method of efficient digital upconversion is provided. The method can include accepting a stream of complex samples which includes a real sample stream and an imaginary sample stream. One of the streams (the real sample stream or the imaginary sample stream) can be filtered to form a half sample interpolated sample stream. The other of the streams can be delayed to form a delayed sample stream. The delay can be equal to the group delay of the half-sample interpolating filter plus one-half sample. Another operation of the method can be performing a quarter rate upconversion on the half sample interpolated sample stream and the delayed sample stream to form a real frequency-shifted sample stream.

In some embodiments of the invention an efficient digital upconverter device is provided. The device can include a half-sample interpolating filter configured to filter either one of a real part or an imaginary part of an input sample stream to form a filtered sample stream. The device can also include a delay unit configured to delay the other one of the real part or the imaginary part of the input sample stream. The delay unit can have a delay equal to the group delay of the half-sample interpolating filter plus one-half sample. A quarter-rate upconverter can be operatively coupled to the half-sample interpolating filter and the delay unit. The quarter-rate upconverter can combine a filtered sample stream from the half-sample interpolating filter and a delayed sample stream from the delay unit to form a real frequency-shifted sample stream.

In some embodiments of the invention, an efficient digital upconverter device is provided. The device can include a means for accepting a stream of complex samples comprising a real sample stream and an imaginary sample stream. A means for filtering and a means for delaying can be provided. Either one of the real sample stream and the imaginary sample stream can be filtered to produce a filtered sample stream. The other can be delayed to produce a delayed sample stream. The filtering can use a half-sample interpolating filter having a group delay. The delay can have a delay of equal to the group delay of the half-sample interpolating filter plus one-half sample. A means for combining and frequency shifting the filtered sample stream and the delayed sample stream together can be used to form a real frequency-shifted sample stream.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Figure 1:
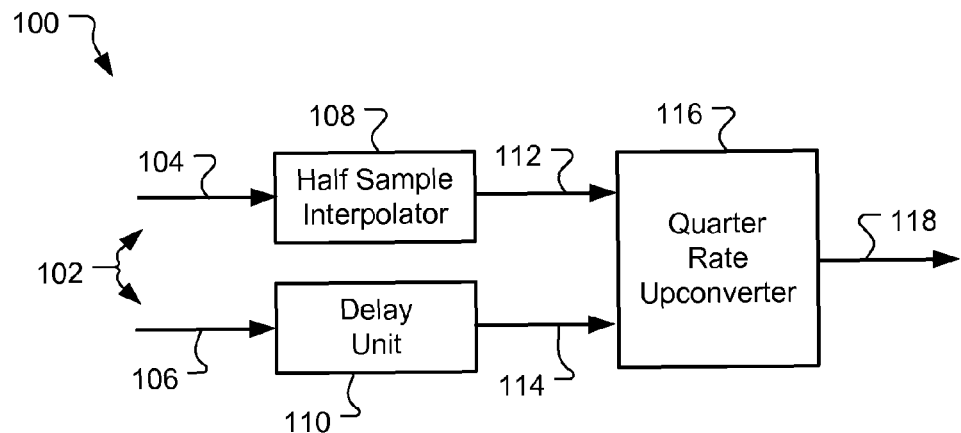
FIG. 1 is a block diagram of an efficient upconverter in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a filter includes reference to one or more filters.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

By the term "substantially" is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also as including all the individual numerical values or sub-ranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As discussed herein, mention is made of streams of samples. It is to be appreciated that, usually, a sample stream has an associated sample rate. While in some instances, the associated sample rate is equal to a clock rate at which samples are produced (e.g., in an analog to digital converter with no output buffering), in other instances, the associated sample rate can be unrelated to a clock rate used to transfer (e.g., input or output) the sample stream. For example, transfer of multiple samples can be performed in parallel, in which case the clock rate used for transfer of samples is typically a fraction of the sample rate associated with the samples. Such parallel transfer is helpful when parallel, block, or batch processing implementations are used. As another example, samples can be transferred in a serial format, wherein individual bits of a sample are sent serially across a single data line. In a serial transfer, a clock rate used for transfer of the sample stream can be a multiple of the sample rate associated with the digital samples.

As a specific illustration, and not by way of limitation, a sample stream at a 1 GHz sample rate can be transferred at a clock rate of 250 MHz, wherein four samples are provided in parallel. The sample stream can be input into a memory, where processing is performed on the sample stream. The processing can be performed at a processing rate unrelated to the sample rate. The processing can produce a rate change, for example, upsampling the samples to a 2 GHz sample rate by producing interpolated samples. The interpolated samples can also be stored in the memory, and thus there may be no physical clock signal corresponding to the 2 GHz sample rate. The interpolated samples can then be downsampled to a 400 MHz sample rate, again using processing performed at a processing rate unrelated to the sample rate. The 400 MHz sample rate samples can then be output from the memory, transferred in an asynchronous manner (e.g. direct memory access bursts) across an interface, while an average transfer rate is equal to the 400 MHz sample rate. This example is presented as an illustration for the purposes of explaining terminology, and it will be appreciated that many different combinations of sample rates, processing clock rates, input clock rates and output clock rates can be used in various embodiments of the present invention. Accordingly, while much of the following discussion is presented as though the processing operations occur at the sample rate of the corresponding samples, it is to be appreciated that processing may be performed in buffered or batch manner as just described.

Returning to the discussion above, in digital modems, it is often desirable to convert a complex baseband signal to a real passband signal while still in the digital format. This can be performed by using an interpolator to upsample the signal, and a mixer to frequency shift the signal. Interpolating to a higher sample rate is performed because a higher sample rate allows for the representation of higher frequencies, such as the upconverted frequencies that will be produced in the mixer. The mixer is used to move the signal away from a zero-carrier frequency so that only positive frequencies are present. This allows the signal to be represented in a real form.

It has been recognized by the present inventors that substantial complexity reduction in a digital upconverter can be achieved by using a quarter-rate mixing and combining some aspects of the quarter rate mixing and the upsampling interpolation. A quarter-rate mixing can be where the signal is shifted by a frequency of plus or minus one quarter the sample rate associated with the signal.

FIG. 1 illustrates a block diagram of an efficient digital upconverter device in accordance with some embodiments of the present invention. The efficient digital upconverter device, shown generally at 100, can accept a stream of complex samples 102. The complex sample stream can include a real sample stream 104 and an imaginary sample stream 106, alternately referred to as an inphase sample stream and a quadrature sample stream. Input samples can be provided, for example, in a parallel format or serial format. Input samples may be provided or stored in a memory (for example using a direct memory access transfer), buffer, latch, or other storage device. Input samples can represent, for example, pulse-shaped data to be transmitted or other types of data.

The device 100 can include a half-sample interpolating filter 108 and a delay unit 110. The half-sample interpolating filter can be configured to filter either the real sample stream 104 or the imaginary sample stream 106 to produce a filtered sample stream 112. Although shown in FIG. 1 as connected to filter the real sample stream 104, the half-sample interpolating filter can alternatively be connected to filter the imaginary input sample stream 106 as described further below. The delay unit can be configured to delay the other of the real sample stream and the imaginary stream to form a delayed sample stream 114 (i.e., connected to delay the stream the half-sample interpolating filter is not connected to). The delay unit can produce a delay equal to the group delay of the half-sample interpolating filter plus one-half sample. In other words, for a half-sample interpolating filter having a finite impulse response form and a length of 2N samples, the group delay of the half-sample interpolating filter can be N−½ samples, and the delay unit can have a delay of N−1 samples. Various filter lengths and group delay relationships to the filter length can be used, and the foregoing is presented just as one example. In general, the group delay is measured at a frequency (or range of frequencies) of interest. For example, the group delay may be measured at zero frequency for a complex baseband zero carrier frequency signal. As another example, the group delay may be measured at a frequency $F_r$, where a complex baseband zero carrier frequency signal has been frequency shifted to be centered at frequency $F_r$ before being provided to the half-sample interpolating filter and delay unit.

The outputs of the half-sample interpolating filter 108 and the delay unit 110 can be connected to a quarter-rate upconverter 116. The quarter-rate upconverter can combine and frequency shift the filtered sample stream 112 and the delayed sample stream 114 to form a real frequency-shifted sample stream 118.

In some embodiments, operation of a digital upconverter device can be as will now be described mathematically. First, F can be defined as the associated sample rate of the real frequency-shifted sample stream 118, which can be represented as z[k], wherein the index k is a the time (sample count) index. The input complex sample stream 102 can be represented as x[k] which has an associated sample rate of F/2.

In a brute force approach, the input sample stream x[k] can be upsampled by a factor of two using a polyphase interpolator (thus changing the associated sample rate from F/2 to F), so that $$y[2k]=x[k]*h_0[k]$$

$$y[2k+1]=x[k]*h_1[k]$$

wherein a polyphase interpolator can be derived using zero insertion and filtering by filter having impulse response h[k] by separating the coefficients of h[k] into even numbered coefficients $h_0[2k]$ and odd numbered coefficients $h_1[2k+1]$.

However, it has been recognized by the present inventors that simplification in the polyphase interpolator can be obtained when the detailed operation of a quarter rate mixing is considered. Quarter rate mixing corresponds to mixing by a frequency of +F/4 or −F/4 and taking the real part. Thus, quarter rate mixing of the interpolated signal y[k] corresponds to:

$$z[k]=Re\{y[k]e^{j2\pi k/4}\}$$

or $$z[2n]=Re\{y[2n]e^{j2\pi 2n/4}\}$$

$$z[2n+1]=Re\{y[2n+1]e^{j2\pi(2n+1)/4}\},$$

which can be rewritten as:

$$z[4m]=Re\{y[4m]e^{j2\pi(4m)/4}\}$$

$$z[4m+1]=Re\{y[4m+1]e^{j2\pi(4m+1)/4}\}$$

$$z[4m+2]=Re\{y[4m+2]e^{j2\pi(4m+2)/4}\}$$

$$z[4m+3]=Re\{y[4m+3]e^{j2\pi(4m+3)/4}\}.$$

Simplifying this algebraically, and noting that $e^{a+b}=e^a e^b$, $e^{j\pi}=-1$, $e^{j\pi/2}=j$, $e^{j3\pi/2}=e^{-j\pi/2}=-j$, $e^{j2\pi}=1$, and wherein $j=(-1)^{1/2}$, we obtain:

$$z[4m]=Re\{y[4m]\}$$

$$z[4m+1]=Re\{jy[4m+1]\}$$

$$z[4m+2]=Re\{-y[4m+2]\}$$

$$z[4m+3]=Re\{-jy[4m+3]\}.$$

Writing out y[k] in terms of its real (inphase) and imaginary (quadrature) parts $y[k]=y_i[k]+jy_q[k]$, the above can be simplified to yield:

$$z[4m]=y_i[4m]$$

$$z[4m+1]=-y_q[4m+1]$$

$$z[4m+2]=-y_q[4m+2]$$

$$z[4m+3]=y_q[4m+3].$$

Thus, the quarter rate upconversion simplifies to a combination of sign inversion and selection (multiplexing) of the real and imaginary parts of the interpolated samples. Thus, the quarter rate upconversion can be done without multiplications. Moreover, only alternate real and imaginary samples of the interpolated input y[k] are used. Thus, processing can be saved by not calculating those interpolator outputs. Therefore, in terms of the input complex samples:

$$z[4m]=x_i[2k]*h_0[2k]$$

$$z[4m+1]=-x_q[2k]*h_1[2k]$$

$$z[4m+2]=-x_i[2k+1]*h_0[2k]$$

$$z[4m+3]=x_q[2k+1]*h_1[2k].$$

Accordingly, this can result in a factor of two savings relative to a conventional upsampling interpolating and quarter rate mixing approach, since only half as many samples need to be processed by the interpolator filters $h_0[k]$ and $h_1[k]$.

Further simplification can be obtained if the interpolator h[k] is a half-band filter. In particular, a half-band filter can be of the form:

$$h[k]=[h_{2N-1}, 0, h_{2N-3}, 0, \ldots, h_{-1}, h_0, h_1, \ldots, 0, h_{2N-1}].$$

When split into a polyphase sub filters, the resulting component filters are:

$$h_0[k]=[h_{2N-1}, h_{2N-3}, \ldots, h_{-1}, h_1, \ldots, h_{2N-1}] \text{ and}$$

$$h_1[k]=[0, 0, \ldots, h_0, 0, \ldots, 0].$$

Hence, one of the polyphase sub filters is a simply a delayed impulse, representing pure delay (and scaling by $h_1$). This can be further simplified by setting $h_0=1$, to result in pure delay which can be provided by a delay unit. For example, a delay unit can be implemented using buffering (e.g., a circular buffer), delay lines, and other similar arrangements. The delay unit can alternatively be placed on the other side of the quarter-rate upconverter and arranged to delay every other sample. The other filter is a decimated half band filter, which results in a half sample interpolation. Accordingly, another factor of two savings can be obtained, since the delay unit is trivial, and does need multipliers or adders to implement. This approximately factor of two savings, plus the factor of two savings mentioned above yields a factor of four improvement over a conventional upsampling interpolator and mixer. Even further savings can be obtained if the half-sample interpolating filter is symmetric, as the number of multiplications can be cut in half using known techniques.

Returning to the discussion of the half-sample interpolating filter, various filter responses can be used, and the invention is not limited to using half band filters. For example, an ideal interpolator can be expressed by:

$$y[2n]=x[n]$$

$$y[2n+1]=x[n]*h_1[n].$$

Thus, the interpolator $h_1$ can be designed on its own merits, and need not be limited to being a half-band filter. In such a case, the derivation is relatively unchanged, since it can be seen that only half of the samples have a non-trivial filter. The interpolator may, therefore be a finite impulse response filter or an infinite impulse response filter. As realizable filters generally have a positive group delay, the interpolator can alternatively be described by:

$$y[2n]=x[n-K]$$

$$y[2n+1]=x[n]*h_1[n],$$

wherein K corresponds to the group delay of the filter $h_1[n]$, plus one-half a sample (at the frequencies of interest).

Figure 2:
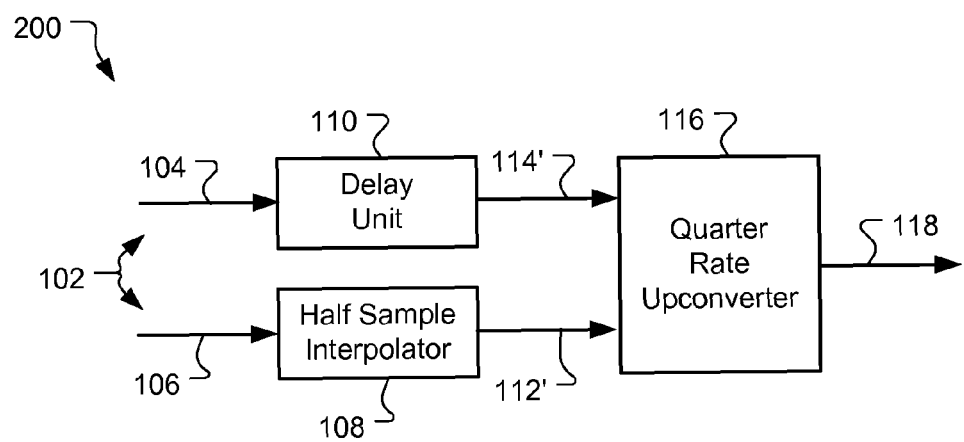
FIG. 2 is a block diagram of an alternate configuration of an efficient upconverter in accordance with some embodiments of the present invention.

As alluded to above, the position of the half-sample interpolating filter and the delay unit can be exchanged. The mathematical derivation above need not be repeated in detail, other than to note that shifting the phase of the quarter rate upconversion by $\pi/4$ will have the effect of swapping the position of the delay and the half sample interpolator on the real and imaginary channels. Accordingly, as illustrated in FIG. 2, an efficient digital upconverter 200 can be arranged in an alternate manner, where the delay unit 110 delays real samples 104 to produce the delayed sample stream 114' and the half-sample interpolating filter 108 filters imaginary samples 106 to produce the filtered sample stream 112'. Other arrangements can be obtained corresponding to shifting the phase of the quarter rate upconversion by $\pi/2$ or $3\pi/4$ ($-\pi/4$).

Also, as alluded to above, the frequency shift can be by either +F/4 or −F/4. Again, the mathematical derivation above need not be repeated in detail, other than to note that shifting by −F/4 will result in the signs being different, corresponding to a minor difference in which samples are inverted.

Figure 3:
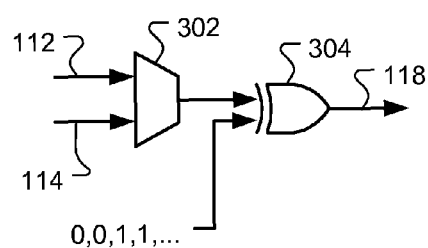
FIG. 3 is a block diagram of a quarter-rate upconverter in accordance with some embodiments of the present invention.
Figure 4:
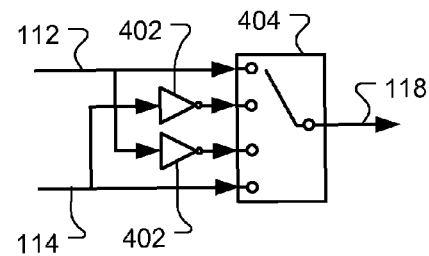
FIG. 4 is a block diagram of another arrangement of a quarter-rate upconverter in accordance with some embodiments of the present invention.

Turning to the quarter-rate upconverter 116, various arrangements of components can be used. For example, in a software implementation (e.g., computer executable instructions stored in a memory for execution by a general-purpose processor or digital signal processor), swapping of samples is easily accomplished using various indexing computations or when data is moved for input or output. In a hardware implementation (e.g., an application specific integrated circuit or field programmable gate array), the quarter-rate upconverter can be implemented using multiplexers, commutators, inverters, exclusive or gates, and similar components to multiplex together the filtered sample stream and the delayed sample stream and invert every other one of each of the streams. For example, FIG. 3 illustrates a quarter-rate upconverter in accordance with some embodiments of the invention implemented using a multiplexer 302 and exclusive-or gate 304. FIG. 4 illustrates another quarter-rate upconverter in accordance with some embodiments of the invention using inverters 402 and a switch 404 (commutator). The invention is not limited to these examples, and other implementations of a quarter-rate upconverter which perform the same or similar operations can be used.

Figure 5:
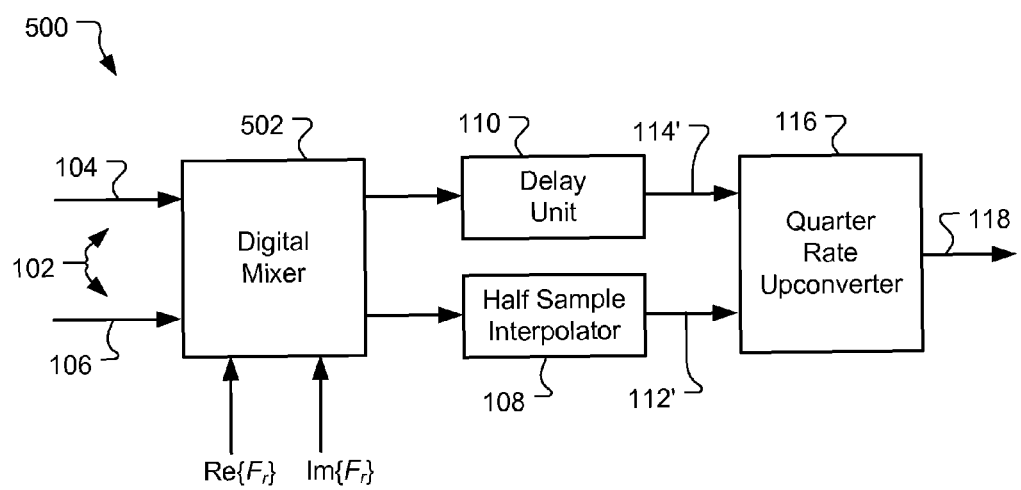
FIG. 5 is a block diagram of another alternate arrangement of an efficient upconverter in accordance with some embodiments of the present invention.

In some situations, a frequency shift different than F/4 may be desired. In such a case, an additional mixing operation can be performed. For example, as illustrated in FIG. 5, an efficient digital upconverter 500 can include a digital mixer 502 placed before the half-sample interpolating filter 108 and the delay unit 110. In general, an overall frequency shifting (mixing) of $F_c$ can be accomplished by decomposing $F_c$ into various components $F_c=iF+(\pm F/4)+F_r$, wherein $F_r$ is a residual mixing frequency applied to the digital mixer, and i is an integer. It will be appreciated that the integer multiples of iF are indistinguishable in the digital domain, but can be obtained using different Nyquist zones when a digital to analog conversion is performed.

Figure 6:
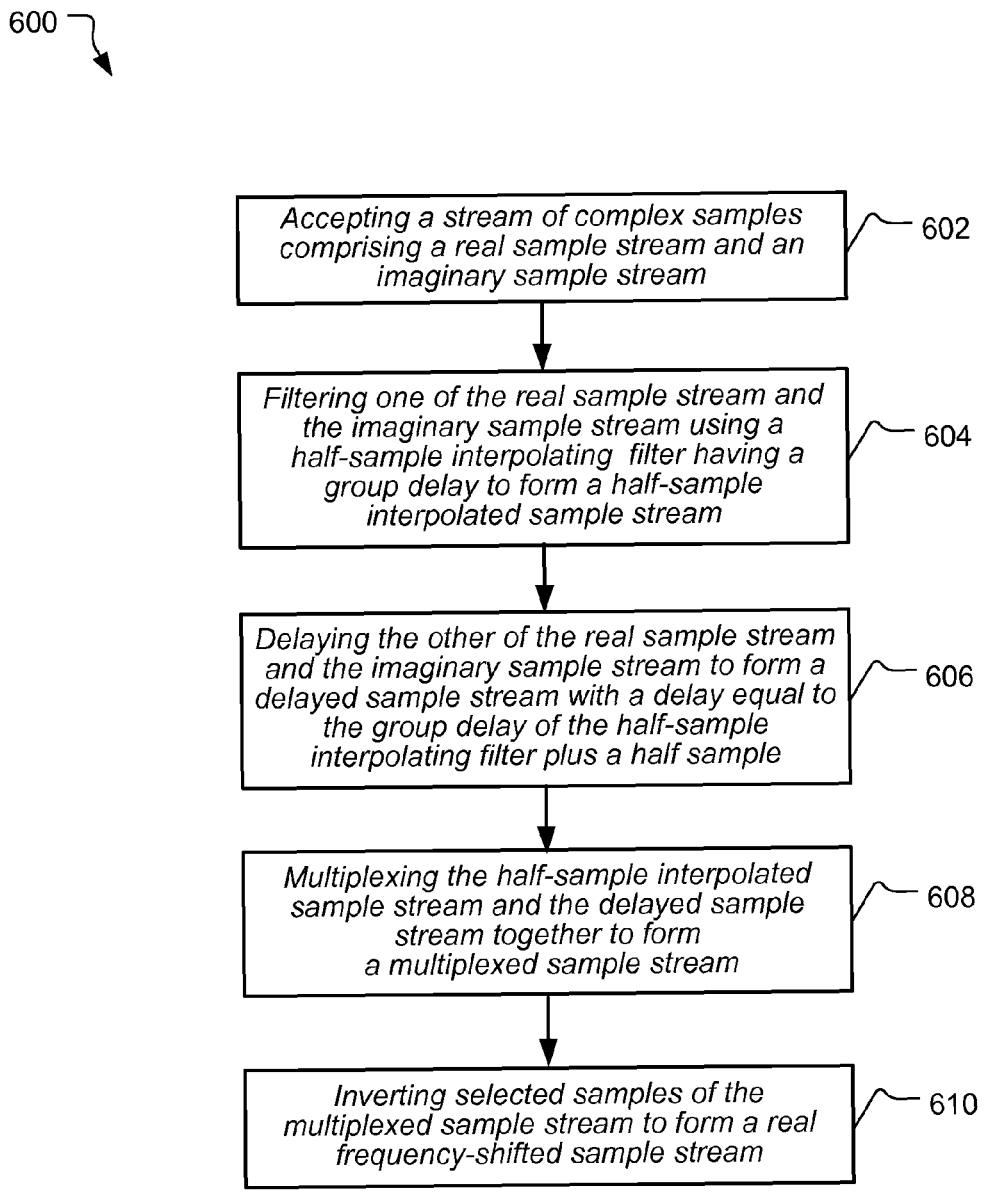
FIG. 6 is a flow chart of a method for efficient upconversion in accordance with some embodiments of the present invention.

FIG. 6 illustrates a flow chart for a method of efficient upconversion in accordance with some embodiments of the present invention. The method, shown generally at 600, can include accepting 602 a stream of complex samples comprising a real sample stream and an imaginary sample stream. For example, input samples can be provided as described above.

The method 600 can also include filtering 604 either one of the real or the imaginary sample stream, and delaying 606 the other. For example, the real samples can be filtered and the imaginary samples delayed. As another example, the imaginary samples can be filtered and the real samples delayed. The filtering can produce filtered samples which are half-sample interpolated samples. The filtering can be performed using a decimated half-band filter. The filtering can be a symmetric filter. Delaying can produce a delay equal to the group delay of the filtering plus one-half sample. Various examples of filtering and delaying are described above which can be used in the method.

Additional operations of the method 600 can be multiplexing 608 the filtered samples and delayed samples together and inverting selected samples 610 to form a real frequency-shifted sample stream. The frequency shift can be one quarter the sample rate associated with the sample stream, and can be in a positive or negative direction. Various ways of multiplexing and inverting samples are described above.

The real frequency-shifted sample stream can also be converted to an analog signal, for example, using an analog to digital converter (not shown). Additional mixing operations can be performed, for example, by digitally mixing the complex samples before input to the half-sample interpolating filter and the delay.

In some embodiments, the method can be implemented in a digital signal processor (not shown). For example, input samples can be provided to the digital signal processor and real frequency-shifted samples output from the digital signal processor. As another example, input samples and/or output samples can be provided from other processing functions implemented in the digital signal processor. Instructions for implementing the method may be stored on a computer readable media, and the instructions may be in the form of computer-executable instructions which cause a computer to execute the operations of the method.

In some embodiments, the method can be implemented in digital hardware. For example, the various blocks of FIGS. 1-5 can be implemented using discrete digital components, logic equations in a programmable device, gates in an integrated circuit and similar arrangements. The design can be defined in the form of a schematic, macro instantiations, hardware description languages, or the like. For a programmable logic device, device loadable instructions for configuring the device to a configuration capable of performing the method can be stored on a memory or similar device. The memory can be used to initialize the programmable logic device, for example, at power on, after a reset, or during a mode change.

Summarizing and reiterating to some extent, efficient digital upconversion can be performed by taking advantage of simplifications resulting from the quarter rate upconversion. Because quarter rate mixing results in multiplication by only +1, +j, −1, or −j, upsampling interpolation of a complex input can be decomposed into relatively few simple operations (e.g., inverting and commutating). In particular, significant filtering need not be performed on both the inphase and the quadrature inputs, and can be performed on just one. Overall reductions in processing by about one-half or about one-quarter can be obtained relative to some conventional upsampling approaches.

Although the foregoing discussion has been presented in the context of a digital communications system, digital upconversion can also find application in other types of systems which use digital signal processing. For example, efficient upconversion may be used in audio signal processing, data storage or retrieval, or radar/sonar transmission.

While a number of illustrative applications have been illustrated, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method of efficient digital upconversion comprising:
accepting a stream of complex samples comprising a real sample stream and an imaginary sample stream;
filtering one of the real sample stream and the imaginary sample stream using a half sample interpolating filter having a group delay to form a half sample interpolated sample stream;
delaying the other of the real sample stream and the imaginary sample stream to form a delayed sample stream with a delay equal to the group delay of the half-sample interpolating filter plus one-half sample;
multiplexing the half sample interpolated sample stream and the delayed sample stream together to form a multiplexed sample stream; and
inverting selected samples of the multiplexed sample stream to form a real frequency-shifted sample stream.

2. The method of claim 1, wherein the filtering comprises filtering the imaginary sample stream and wherein the delaying comprises delaying the real sample stream.

3. The method of claim 1, wherein the filtering one of the real sample stream and the imaginary sample stream comprises performing a decimated half band filter.

4. The method of claim 1, wherein the filtering one of the real sample stream and the imaginary sample stream comprises performing a symmetric filter.

5. The method of claim 1, wherein the inverting selected samples comprises inverting every other sample of the delayed sample stream and inverting every other sample of the half sample interpolated sample stream.

6. The method of claim 1, wherein the inverting selected samples comprises frequency shifting the sample stream by one-fourth a sample rate of the real frequency-shifted sample stream.

7. The method of claim 6, wherein the frequency shifting is in a positive direction.

8. The method of claim 1, wherein the complex samples have an associated sample rate of F/2 and the real frequency-shifted sample stream has an associated sample rate of F.

9. The method of claim 1, further comprising performing a digital mixing operation on the stream of complex samples.

10. The method of claim 1, further comprising converting the real frequency-shifted sample stream to an analog signal.

11. An efficient digital upconverter device comprising:
a half-sample interpolating filter configured to filter one of a real part and an imaginary part of an input sample stream to form a filtered sample stream having a group delay;
a delay unit configured to delay the other of the real part and the imaginary part of the input sample stream by a delay equal to the group delay plus one-half sample to form a delayed sample stream; and
a quarter-rate upconverter operatively coupled to the half-sample interpolating filter and the delay unit and configured to combine the filtered sample stream and the delayed sample stream to form a real frequency-shifted sample stream.

12. The device of claim 11, wherein the half-sample interpolating filter is configured to filter the imaginary part of the input sample stream and the delay unit is configured to delay the real part of the input sample stream.

13. The device of claim 11, wherein the half-sample interpolating filter is a decimated half band filter.

14. The device of claim 11, wherein the half-sample interpolating filter is a symmetric filter.

15. The device of claim 11, wherein the quarter-rate upconverter comprises:
a multiplexer configured to multiplex together the filtered sample stream and the delayed sample stream; and
an inverter configured to invert every other one of the filtered sample stream and every other one of the delayed sample stream.

16. The device of claim 11, wherein the quarter-rate upconverter comprises a commutator operatively coupled to the half-sample interpolating filter and the delay unit, wherein the half-sample interpolating filter and the delay unit each comprise complementary outputs.

17. The device of claim 11, wherein the quarter-rate upconverter is configured to provide a positive frequency shift.

18. The device of claim 11, further comprising a digital mixer operatively coupled to the input side of the half-sample interpolating filter and the input side of the delay unit.

19. The device of claim 11, wherein the input sample rate has an associated sample rate of F/2 and the real frequency-shifted sample stream has an associated sample rate of F.

20. An efficient digital upconverter device comprising:
means for accepting a stream of complex samples comprising a real sample stream and an imaginary sample stream;
means for filtering one of the real sample stream and the imaginary sample stream using a half-sample interpolating filter having a group delay to form a half sample interpolated sample stream;
means for delaying the other of the real sample stream and the imaginary sample stream to form a delayed sample stream, wherein the delay is equal to the group delay of the half-sample interpolating filter plus one-half sample; and
means for combining and frequency shifting the half sample interpolated sample stream and the delayed sample stream together to form a real frequency-shifted sample stream.

21. The device of claim 20, wherein the means for combining and frequency shifting converts the stream of complex samples from an associated sample rate of F/2 into the real frequency-shifted sample stream with an associated sample rate of F.

* * * * *